United States Patent Office 3,682,811
Patented Aug. 8, 1972

3,682,811
HYDROCONVERSION PROCESS
Bernard F. Mulaskey, Fairfax, Calif., assignor to Chevron Research Company, San Francisco, Calif.
No Drawing. Continuation-in-part of application Ser. No. 858,128, Sept. 15, 1969, now Patent No. 3,598,724, which is a continuation-in-part of application Ser. No. 742,321, July 3, 1968, now Patent No. 3,487,007, which is a continuation-in-part of application Ser. No. 645,855, June 8, 1967, now Patent No. 3,399,132, which in turn is a continuation-in-part of application Ser. No. 568,536, July 28, 1966. This application Apr. 29, 1970, Ser. No. 33,087
Int. Cl. C10g 13/02, 13/04
U.S. Cl. 208—111
7 Claims

ABSTRACT OF THE DISCLOSURE

A hydroconversion process which comprises contacting a hydrocarbon feed in the presence of hydrogen with a catalyst comprising a mixture of (1) a layered crystalline clay-type aluminosilicate and (2) an amorphous porous inorganic oxide in association with nickel and tin in an amount of from 2 to 50 combined weight percent metals with a nickel to tin weight ratio of from 0.25 to 20.

CROSS REFERENCES

This application is a continuation-in-part of application Ser. No. 858,128, filed Sept. 15, 1969 (now 3,598,724), which in turn is a continuation-in-part of application Ser. No. 742,321, filed July 3, 1968 (now 3,487,007), which is in turn a continuation-in-part of application Ser. No. 645,-855, filed June 8, 1967, now U.S. Patent No. 3,399,132, which is in turn a continuation-in-part of application Ser. No. 568,536, filed July 28, 1966, now abandoned.

The disclosures of the aforementioned patents and applications are incorporated by reference into the present application, particularly those portions relating to hydroconversion reactions and catalyst compositions containing nickel, tin and an inorganic oxide carrier.

BACKGROUND OF THE INVENTION

Field of the invention

The present invention relates to the hydroconversion of hydrocarbon feedstocks. More particularly, the present invention relates to the hydroconversion of hydrocarbon feedstocks using a layered crystalline clay-type aluminosilicate together with hydrogenation components.

Prior art

The lightest materials produced in refining are gases at atmospheric pressure, for example, hydrogen, methane, ethane, propane, and butane. Butane and propane are particularly important for use as liquified petroleum gas (LPG). The light hydrocarbon gases have generally been synthesized as a byproduct from the catalytic cracking and hydrocracking of hydrocarbon oils to obtain gasolines and higher boiling products. Although the light gases produced are only a few weight percent of the hydrocarbon feed cracked, they are very valuable, especially the gases containing three or four carbon atoms which are sold as LPG for use as chemical raw materials and household fuels. The use of LPG has rapidly expanded during the last decade. Thus, processes for increasing the production of LPG efficiently have been and are being examined. Processes which primarily produce propane and butane without excessive production of lighter hydrocarbons are especially desired.

SUMMARY OF THE INVENTION

It has now been discovered that a catalyst comprising a mixture of layered crystalline clay-type aluminosilicate (herein referred to in abbreviated form as "crystalline clay") and an amorphous porous inorganic oxide associated with nickel and tin is surprisingly active in converting hydrocarbons to $C_3$ and $C_4$ hydrocarbons. Particularly, the catalyst is surprisingly active in converting 100° F.+ boiling range hydrocarbons to liquid petroleum gasoline (LPG) by hydroconversion reactions which can be referred to as hydrocracking. It has also been found that the above-mentioned catalyst has surprising activity for dehydrogenation reactions such as the dehydrogenation of naphthenes to aromatics. Thus, the hydroconversion process of the present invention comprises contacting a hydrocarbon feed, in the presence of hydrogen, with a catalyst comprising a mixture of (1) a layered crystalline clay-type aluminosilicate and (2) an amorphous porous inorganic oxide in association with nickel and tin in an amount of from 2 to 50 combined weight percent metals with a nickel to tin weight ratio of from 0.25 to 20.

Preferably, the weight ratios of the crystalline clay component to the amorphous porous inorganic oxide-nickel-tin component are from 1:9 to 9:1. Preferably, the crystalline clay component is present in the finished catalyst composition in an amount of from 10 weight percent to 80 weight percent, more preferably from 20 weight percent to 70 weight percent on the basis of the finished catalyst.

The layered crystalline clay-type aluminosilicate can be any catalytically active layered aluminosilicate, although the synthetic hydrated layered crystalline clay-type aluminosilicate of Granquist (U.S. Patent 3,252,757) and the dehydrated form of Capell and Granquist (U.S. Patent 3,252,889) are preferred. The preferred hydrated layered alumino-silicate referred to in U.S. Patent 3,252,-757, incorporated herein by reference thereto, has the empirical formula:

$$n\mathrm{SiO}_2:\mathrm{Al}_2\mathrm{O}_3:m\mathrm{AB}:x\mathrm{H}_2\mathrm{O}$$

where the layer lattices comprise said silica, said alumina, and said B, and where $n$ is from 2.4 to 3.0
$m$ is from 0.2 to 0.6
A is one equivalent of an exchangeable cation having a valence not greater than 2, and is external to the lattice,
B is chosen from the group of negative ions which consists of F−, OH−, ½O− − and mixtures thereof, and is internal in the lattice, and
$x$ is from 2.0 to 3.5 at 50% relative humidity, said mineral being characterized by a $d_{001}$ spacing at said humidity within the range which extends from a lower limit of about 10.4 A. to an upper limit of about 12.0 A. when A is monovalent, to about 14.7 A. when A is a divalent, and to a value intermediate between 12.0 A. and 14.7 A. when A includes both monovalent and divalent cations. The equivalent of an exchangeable cation, A, in said mineral may be chosen from the group consisting of H+, NH$_4$+, Li+, K+, ½Ca++, ½Mg++, ½Sr++, and ½Ba++, and mixtures thereof.

The preferred dehydrated layer aluminosilicate referred to in U.S. Pat. 3,252,889, incorporated herein by reference thereto, has the empirical formula:

$$2.4 \text{ to } 3.0 \text{ SiO}_2:\text{Al}_2\text{O}_3:0.2 \text{ to } 0.6\text{AB}$$

wherein the layer lattices comprise silica ($SiO_2$), alumina ($Al_2O_3$) and B; and wherein A is one equivalent of an exchangeable cation selected from the group consisting of hydrogen, alkali metal, and alkaline earth metal ions, and mixtures thereof; and wherein B is one equivalent of an anion selected from the group consisting of fluoride, hydroxyl, and oxygen ions, and mixtures thereof;
said crystalline material being further characterized by a $d_{001}$ spacing ranging from 9.6 to 10.2 Angstrom units determined at 50% relative humidity and being predominantly ordered in two dimensions.

The dehydrated layered aluminosilicate of 3,252,889 is obtained from the hydrated layered aluminosilicate of U.S. Pat. 3,252,757 by calcination at a temperature within the range of 600 to 1450° F., preferably 600 to 1200° F. Upon calcination of the hydrated form, and removal of water, the $d_{001}$ spacing of the aluminosilicate collapses somewhat, resulting in a layered aluminosilicate of a smaller $d_{001}$ spacing. According to the teachings of U.S. Pat. 3,252,889, the collapse is irreversible and the dehydrated layered aluminosilicate is no longer capable of swelling—apparently the removal of water from the hydrated form results in a new and different chemical and indeed mineralogical species from the starting material.

The layered aluminosilicates are to be distinguished from the crystalline zeolitic molecular sieve components which have well ordered and uniform pore structures as a result of the crystalline structures having bonds that are substantially equally strong in three dimensions.

Generally when the layer aluminosilicate is in a sodium form, it is preferred for the process of the present invention that the sodium ions be replaced with other ions lower in the electromotive series than sodium. The sodium ion concentration on the layered aluminosilicate should preferably be less than about 1 weight percent. Thus, the layered aluminosilicate may contain, in place of the sodium, ions such as, e.g., calcium, magnesium, strontium, barium, rare earth metal ions, Groups IV through VIII metal ions, etc. It is particularly preferred that the layered aluminosilicate exists substantially in the ammonia or hydrogen form. When a sodium form of the layered aluminosilicate is one of the starting materials, it may be converted to the ammonia or hydrogen form by ion-exchange prior to being combined with the platinum group component-porous amorphous solid carrier. Alternately it may be combined with the other catalytic components, i.e., the platinum group component-porous amorphous solid carrier, and then converted to the ammonia or hydrogen form by ion-exchange.

The other component of the catalyst mixture used in the present invention comprises an amorphous porous inorganic oxide having associated therewith nickel and tin or their compounds.

For purposes of the present application, it is to be understood that although the nickel and tin components of the amorphous porous inorganic oxide-nickel-tin may simply be referred to as nickel and tin, the nickel and tin generally are present in the form of a compound as, for example, nickel oxide, nickel sulfide, or nickel stannate or an alloy of nickel and tin. Portions of the nickel and tin may be present simply as the elements nickel and tin but usually at least a portion of the nickel and at least a portion of the tin is present in the form of a compound.

The amorphous porous inorganic oxide preferably has a surface area of 50–750 m.$^2$/gm., preferably 150–750 m.$^2$/gm. The carrier can be natural or synthetically-produced inorganic oxides or a combination of inorganic oxides. Typical inorganic oxide supports which can be used are silica, alumina, magnesia and zirconia. Combinations of amorphous porous inorganic oxides can be used, e.g., silica-alumina, silica-magnesia, silica-zirconia, silica-magnesia-titania, and silica-alumina-zirconia.

A particularly preferred amorphous porous inorganic oxide carrier is silica. A variety of methods are available for producing suitable silica supports. Silica can be preduced by hydrolyzing tetraethyl orthosilicate with aqueous HCl solution. Likewise, silica can be prepared by contacting silicon tetrachloride with a cold methanol and water solution or with 95 percent ethyl alcohol, or with cold water or ice. Also silica can be prepared by contacting sodium silicate with an ion-exchange resin to remove the sodium or by contacting with an acid at a pH of about 2.5 or less. Further, silica can be prepared by adding $CO_2$, preferably under pressure, to sodium silicate.

The amorphous porous inorganic oxide will have in association therewith nickel and tin or their compounds. Preferably the nickel and tin will be present in an amount of from 2 to 50 combined weight percent metals based on the amorphous porous inorganic oxide component of the catalyst mixture. Regardless of the form in which the nickel and tin exist on the catalyst, whether as metallic nickel and metallic tin, or compounds of nickel and compounds of tin, such as the oxides or sulfides, the total combined weight percent of the nickel and tin associated with the amorphous porous inorganic oxide, calculated as the metal, should be from 2 to 50. Preferably, the nickel and tin, or compounds thereof, are present in an amount of from 5 to 30 combined weight percent and more preferably from 7 to 25. Weight percents given herein for the nickel and the tin are on the basis of the weight of the nickel-tin-amorphous porous inorganic oxide(s) component of the catalyst mixture.

The nickel and tin, or their compounds, should be present in association with the amorphous porous inorganic oxide in a weight ratio of nickel to tin of from 0.25 to 20 determined as the metals. Preferably the nickel to tin weight ratio is from 0.5 to 20 and more preferably from 0.5 to 10. In general, when employing high combined weights of nickel and tin, it is preferred to use high nickel to tin weight ratios.

The presence of tin in association with nickel and an amorphous porous inorganic oxide imparts increased hydrogenation activity and cracking activity to the catalytic composition as compared to a catalyst comprising nickel but without tin. Furthermore, the presence of tin decreases the fouling rate of the catalyst during hydrocracking as compared to a catalyst comprising nickel without tin. In addition, particularly when halogens such as flourine or fluoride are present in the catalyst composition, tin retards nickel crystallites growth which the fluoride tends to cause.

In accordance with a preferred embodiment of the present invention, the conditions employed for the hydroconversion of the hydrocarbon feedstock are sufficiently severe to obtain at least 30 weight percent conversion to $C_3$ and $C_4$ hydrocarbons and still more preferably are sufficiently severe to obtain at least 50 weight percent conversion to $C_3$ and $C_4$ hydrocarbons. Suitable operating conditions for the process of the present invention include a temperature between about 500 and 1300° F., a pressure between about 10 p.s.i.a. and 5000 p.s.i.a. and a liquid hourly space velocity (LHSV) between about 0.1 and 10. Preferred conditions for use in the present invention, particularly when sufficiently severe conditions are desired to obtain at least 30 or 50 or higher weight percent conversions to LPG hydrocarbons such as $C_3$ and $C_4$ hydrocarbons, include a temperature between about 750 and 1100° F., a pressure between about atmospheric pressure and 1500 lbs., and a relatively low LHSV, preferably between about .4 and 2.0.

The crystalline clay and the amorphous porous inorganic oxide carrier associated with nickel and tin, or their compounds, can be admixed with each other in any of a number of different ways. For example, the crystalline clay can be suspended and distributed throughout an amorphous porous inorganic oxide. Thus, the crystalline clay can be dispersed in a sol of the amorphous porous inorganic oxide, e.g., a siliceous sol or aluminous sol, prior to gelation of the sol. Alternately, the crystalline clay can be dispersed in a hydrogel of the amorphous porous inorganic oxide.

It is particularly preferred in the process of the present invention to use a catalyst mixture comprising a physical mixture of discrete particles of crystalline clay and in a nickel-tin-amorphous porous inorganic oxide hydrogel matrix. This discrete particles of the crystalline cay component and the nickel-tin component can be prepared by simply mixing each of these components. Crystalline clay powder can be mixed with nickel, tin silica hydrogel followed by forming the mass into a catalyst particle as, for example, by extrusion. Alternately, nickel-tin-porous inorganic oxide particles may be mixed with very fine crystalline clay particles and then pelleted, cast, molded, or otherwise formed into pieces of desired size and shape, such as rods, spheres, pellets, or other configurations. The particle size of the individual components of the physical mixture may be very small, e.g., less than about 50 microns. Alternately, the particles may be sufficiently large and distinct as to permit ready separation thereof by mechanical means which in turn makes possible separate regeneration, reactivation, and replacement of the two components. Accordingly, the particle size of the two components making up a particle-form physical mixture may fall within the approximate range of 2 to 50 mesh (Tyler), but the crystalline clay is usually a fine powder with particle sizes in the 1 to 50 micron range.

We have found that using a catalyst in accordance with the present invention, in particular a nickel-tin-silica component together with about 50 weight percent crystalline clay, affords at least the following advantages: (1) it operates at relatively high temperatures of naphtha cracking with less $C_1$ and $C_2$ formation than with other commercially attractive naphtha cracking catalyst; (2) the catalyst in accordance with the present invention has been found to operate at high conversion levels as, for example, conversion levels of approximately 100 percent of the hydrocarbon feed material to material boiling below the initial point of the hydrocarbon feed material with a relatively high degree of selectivity for LPG; (3) the catalyst can be successfully used at pressures as low as about atmospheric pressure and produce considerable quantities of butenes along with LPG; (4) perhaps most importantly, we have found that at a pressure of about 500 p.s.i.g. and a temperature of about 900–1000° F., the catalyst of the present invention can be used to selectively crack a wide range of hydrocarbons boiling from about 100° F. up to 1000° F. or more, to naphtha range hydrocarbons and paraffins. The catalyst of the present invention dehydrogenates naphthinic hydrocarbons present in naphtha to aromatics which remain in the effluent from the hydroconversion reaction zone in a process in accordance with the present invention. At 50 percent conversion, we have obtained a $C_6^+$ stream containing almost pure alkyl benzenes. Thus, a particularly preferred embodiment of the present invention comprises using a catalyst in accordance with the present invention, preferably a nickel-tin-silica-crystalline clay catalyst to convert hydrocarbons to LPG and aromatic hydrocarbons simultaneously in the same reaction zone. The LPG can be used as a fuel gas and the aromatic hydrocarbons can be used as feedstocks for chemical processes. Also, because the cracking reaction occurring to form the LPG is exothermic, while the dehydrogenation reaction to form aromatics is endothermic, the process of the present invention can be operated to form light paraffins and aromatics with only a small amount of heat required.

The hydrocarbon feedstocks for the process of the present invention can cover a wide range of hydrocarbon feedstocks. However, hydrocarbon feedstocks boiling within the range of about 150–450° F. are preferred. Thus, in accordance with a preferred embodiment of the present invention, a process is provided for converting a feed boiling within the range from 150 to 450° F. to light hydrocarbon gases comprising propane and butane which process comprises contacting the feed, in the presence of hydrogen, with a catalyst comprising a layered crystalline clay-type aluminosilicate thoroughly admixed with an amorphous porous inorganic oxide containing nickel and tin, or their compounds, in an amount of from 2 to 50 combined weight percent metals with a nickel to tin combined weight ratio of from 0.25 to 20 and at hydrocracking conditions sufficiently severe to convert at least 50 weight percent of the feed to products boiling below 150° F.

DETAILED DESCRIPTION

The portion of the catalyst comprising the amorphous porous inorganic oxide in association with nickel and tin can be prepared by any of the conventional methods for associating catalytically active amounts of hydrogenating metal components with the carrier. Thus, the nickel and tin components can be associated with an amorphous porous inorganic oxide by impregnation or by ion-exchange. Impregnation is generally accomplished using an aqueous solution of a suitable nickel compound and/or tin compound. Either simultaneous or sequential impregnation of the metal components is suitable. Ion-exchange is generally accomplished by using an aqueous solution of a suitable nickel and/or tin salt wherein the nickel and/or tin is present in the cationic state. As examples, in the preparation of a catalyst wherein the carrier is an amorphous silica-alumina, the nickel and tin are normally associated with the silica-alumina by impregnation. Typical nickel and tin compounds which can be used for impregnation or ion-exchange are the chlorides, nitrates, sulfates, acetates and amine complexes. The tin can be in the stannous or stannic oxidation state.

The nickel and tin, or their compounds, can be associated with the amorphous porous inorganic oxide by coprecipitation or cogelation of a mixture of compounds of the hydrogenating metals and compounds of the metals and/or non-metals whose oxides form the amorphous porous inorganic oxide carrier. Both hydrogenating metal components can be coprecipitated or cogelled with the compounds of the metals and/or non-metals whose oxides form the inorganic oxide carrier; or, one of the hydrogenating metal components can be associated with the amorphous porous inorganic oxide carrier by coprecipitation or cogelatin, and the other hydrogenating metal component then intimately associated with the coprecipitated composite by impregnation or other suitable means. For example, a coprecipitated composite of tin, or compound thereof, and silica-alumina can be prepared by coprecipitating a mixture of stannous chloride, aluminum chloride, and sodium silicate. Nickel, e.g., as nickel chloride, can then be intimately associated with the coprecipitated composite by impregnation.

A preferred method of preparation of the nickel-tin-porous oxide catalytic composition of the present invention is by simultaneous coprecipitation or cogelation of a mixture of nickel and tin compounds, and compounds of the metals and/or non-metals whose oxides form the amorphous porous inorganic oxide carrier. The method of preparation of a coprecipitated composite of only one of the hydrogenating metals and an amorphous porous inorganic oxide can be the same as that for a coprecipitated composite of both metals and an amorphous porous inorganic oxide. For the sake of brevity, the preparation of a coprecipitated composite will be described only in terms of using both hydrogenating metals in the coprecipitated composite. In general, preparation of the coprecipitated composite can be accomplished by forming a solution and/or a sol of the compounds, subsequently precipitating the mixture, preferably at a pH from about 5.5 to 8, by the addition of a precipitating agent as, for example, a base, and then washing the coprecipitated composite to remove extraneous materials. Finally, the coprecipitated composite can be dried and then calcined at an elevated temperature. Thus, for example, a coprecipitated composite comprising nickel and tin intimately associated with silica-alumina can be prepared by forming an aqueous solution of aluminum chloride, sodium silicate, nickel chloride and stannous chloride. The solution can then be coprecipitated by the addition of ammonium hydroxide; thereafter the coprecipitated composite can be washed, dried and calcined.

In order to prepare a coprecipitated composite comprising an amorphous porous inorganic oxide and nickel and tin component, it is desirable that the starting components be such that when admixed together, the resulting mixture will form a solution and/or sol so as to obtain uniform dispersion throughout the mixture.

The compounds in the initial mixture can advantageously be salts such as the nitrates, citrates, formates, alkoxides, and sulfates. Preferably chlorides and acetates are employed. In view of the process advantages of using chloride salts due to their readiness to form solutions with other compounds, their commercial availability and relatively low price, it is often desirable to employ them. The anion content, e.g., chloride, in the final coprecipitate is preferably reduced to below about 0.25 percent of the total weight of the final coprecipitate. Washing with water can often effectively lower the anion content to the desirable limit. If anions are present in the coprecipitate which are difficult to remove by washing, such anions can be ion-exchanged with anions more easily removed by washing. Preferred anions for use in ion-exchange are the bicarbonates, carbonates, acetates, and formates.

After formation of the initial mixture, it is coprecipitated by conventional techniques. Precipitation is preferably conducted at a pH between about 5.5 and about 8. Thus, the initial mixture, if acidic, can be precipitated by the addition of a base. If the mixture is basic, it can be precipitated with an acid. The precipitation can be stepwise as by a form of titration, or simultaneous, as by mixing of acidic or basic solutions, as the case may be, in the proper ratios. If is preferable that the precipitating agent should not introduce any components in the mixture that are deleterious.

Following precipitation of the mixture of compounds, the excess liquid is usually removed by filtration. Thereafter, the precipitate is washed and ion-exchanged to remove impurities. Washing is generally conducted in more than one step, using water or dilute aqueous solutions of ammonium salts, e.g., ammonium acetate. The coprecipitated composite is then dried in air or inert gases at a temperature less than 400° F., preferably from about 150°–300° F. The coprecipitate is then calcined, generally at a temperature of from about 750° to 1400° F. in the presence of an oxygen-containing gas.

EXAMPLE

A synthetic naphtha having the composition as shown under "Feed" in Table 1 below was hydroconverted at various temperatures as indicated in Table 1 to obtain the product composition as indicated below at the respective temperatures listed at the top of Table 1.

The catalyst used to obtain the products as indicated in Table 1 was a composite of layered crystalline clay-type aluminosilicate and an amorphous porous inorganic oxide in association with nickel and tin. The layered clay was approximately 67 weight percent of the finished catalyst. The amorphous porous inorganic oxide in this particular catalyst was silica. Thus, the catalyst was a mixture comprising layered aluminosilicate and nickel-tin-silica. The nickel-tin-silica component contained about 9 weight percent nickel calculated as the element nickel and about 6 weight percent tin calculated as the element tin. The nickel-tin-silica component was formed as a hydrogel as described herein above. After washing the hydrogel but before completely drying the hydrogel, layered aluminosilicate was blended with the hydrogel. The catalyst mixture was then reformed, dried and calcined to form the final catalyst mixture of layered aluminosilicate with the nickel-tin-silica component.

The processing conditions included a liquid hourly space velocity of about 1.0, pressure of about 800 p.s.i.g., a liquid synthetic naphtha feed rate of about 4 cc. per hour, and a hydrogen feed rate of about 17,000 s.c.f. per barrel of feed naphtha.

TABLE 1

| | Feed | \multicolumn{5}{c}{Temperature, ° F.} |
|---|---|---|---|---|---|---|
| | | 795 | 826 | 841 | 858 | 873 |
| Weight percent: | | | | | | |
| Methane | | 0.54 | 0.88 | 1.21 | 1.56 | 2.02 |
| Ethane | | 0.85 | 1.61 | 2.29 | 2.97 | 3.88 |
| Propane | | 9.54 | 19.36 | 27.37 | 34.11 | 43.22 |
| Iso-C$_4$ | | 0.73 | 1.51 | 1.99 | 2.43 | 3.16 |
| N-C$_4$ | | 1.27 | 2.44 | 3.43 | 4.67 | 5.98 |
| Total cracked product | | 12.92 | 25.80 | 36.30 | 45.74 | 58.26 |
| Iso-C$_5$ | 13.48 | 25.93 | 26.55 | 25.56 | 24.04 | 21.04 |
| N-C$_5$ | 27.31 | 18.53 | 16.15 | 15.59 | 14.85 | 13.27 |
| 2, 2 dimethyl butane | | 2.43 | 3.63 | 2.96 | 2.17 | 1.04 |
| 2, 3 dimethyl butane | | 2.66 | 2.05 | 1.50 | 1.06 | 0.53 |
| 2 methyl pentane | 11.60 | 13.66 | 9.64 | 6.97 | 4.81 | 2.31 |
| 3 methyl pentane | 12.69 | 9.97 | 7.05 | 5.07 | 3.48 | 1.69 |
| N-C$_6$ | 25.65 | 9.86 | 6.85 | 4.86 | 3.18 | 1.46 |
| Methyl cyclopentane | 2.09 | 3.64 | 2.09 | 1.08 | 0.63 | 0.19 |
| Cyclo-C$_6$ | 7.12 | 0.39 | 0.20 | 0.10 | 0.05 | |

As can be seen from Table 1, using a catalyst in accordance with the process of the present invention results in particularly high conversion of naphtha boiling range hydrocarbons to LPG product at temperatures above about 800° F. At temperatures above 850° F., as for example at 873° F., a yield of over 43 weight percent propane was obtained from the synthetic naphtha feed. At temperatures below about 800° F., the catalyst according to the present invention shows surprisingly high isomerization activity.

Although various embodiments of the invention have been described, it is to be understood that they are meant to be illustrative only and not limiting. Certain features may be changed without departing from the spirit or scope of the invention. It is apparent that the present invention has broad application to the hydroconversion of hydrocarbon feedstocks using a catalyst mass which is a mixture of layered crystalline clay-type aluminosilicate and a nickel-tin-amorphous-porous inorganic oxide component. Accordingly, the invention is not to be construed as limited to the specific embodiments or examples discussed but only as defined in the appended claims.

I claim:

1. A hydroconversion process which comprises contacting a hydrocarbon feed in the presence of hydrogen with a catalyst comprising a physical mixture of discrete particles of:

(1) a synthetic layered crystalline clay-type aluminosilicate having the empirical formula selected from the class consisting of:

(a) $nSiO_2:Al_2O_3:mAB:xH_2O$ where the layer lattices comprise said silica, said alumina and said B, and where
   $n$ is from 2.4 to 3.0
   $m$ is from 0.2 to 0.6
   A is one equivalent of an exchangeable cation having a valence not greater than 2, and is external to the lattice,
   B is chosen from the group of negative ions which consists of $F^-$, $OH^-$, $\frac{1}{2}O^{--}$ and mixtures thereof, and is internal in the lattice, and
   $x$ is from 2.0 to 3.5 at 50% relative humidity, said mineral being characterized by a $d_{001}$ spacing at said humidity within the range which extends from a lower limit of about 10.4 angstroms to an upper limit of about 12.0 angstroms when A is monopalent, to about 14.7 angstroms when A is divalent, and to a value intermediate between 12.0 angstroms and 14.7 angstroms when A includes both monovalent and divalent cations; and (b)     2.4 to 3.0 $SiO_2:Al_2O_3:0.2$ to 0.6 AB wherein the layer lattices comprise silica ($SiO_2$), alumina ($Al_2O_3$) and B; and wherein A is one equivalent of an exchangeable cation selected from the group consisting of hydrogen, alkali metal, and alkaline earth metal ions, and mixtures thereof; and B is one equivalent of an anion selected from the group consisting of fluoride, hydroxyl, and oxygen ions, and mixtures thereof;

said crystalline material being further characterized by a $d_{001}$ spacing ranging from 9.6 to 10.2 angstrom units determined at 50% relative humidity, and being predominantly ordered in two dimensions; and (2) an amorphous porous inorganic oxide composited with nickel and tin in an amount of from 2 to 50 combined weight percent metals with a nickel to tin weight ratio of from 0.25 to 20.

2. A process in accordance with claim 1 wherein the hydroconversion conditions are sufficiently severe to obtain at least 30 weight percent conversion to $C_3$–$C_4$ hydrocarbons.

3. A process in accordance with claim 1 wherein said hydroconversion conditions are sufficiently severe to obtain at least 50 weight percent conversion to $C_3$–$C_4$ hydrocarbons.

4. A process in accordance with claim 1 wherein the porous inorganic oxide is silica.

5. A process in accordance with claim 1 wherein said nickel and said tin are present in an amount of from 5 to 30 combined weight percent metals.

6. A process in accordance with claim 1 wherein said layered crystalline clay-type aluminosilicate is present in an amount of from 10 to 80 weight percent in the finished catalyst mixture.

7. A process for converting a feed boiling within the range from 150 to 450° F. to light hydrocarbon gases comprising propane and butane which comprises contacting a feed boiling within the range from 150 to 450° F., in the presence of hydrogen, with catalyst comprising a physical mixture of discrete particles of (1) a layered crystalline clay-type aluminosilicate having the empirical formula selected from the class consisting of:

(a) $nSiO_2:Al_2O_3:mAB:xH_2O$ where the layer lattices comprise said silica, said alumina and said B, and where $n$ is from 2.4 to 3.0
$m$ is from 0.2 to 0.6

A is one equivalent of an exchangeable cation having a valence not greater than 2, and is external to the lattice, B is chosen from the group of negative ions which consists of $F^-$, $OH^-$, $\tfrac{1}{2}O^{--}$ and mixtures thereof, and is internal in the lattice, and $x$ is from 2.0 to 3.5 at 50% relative humidity, said mineral being characterized by a $d_{001}$ spacing at said humidity within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations; and (b)  2.4 to 3.0 $SiO_2:Al_2O_3$:0.2 to 0.6 AB wherein the layer lattices comprise silica ($SiO_2$), alumina ($Al_2O_3$) and B; and wherein A is one equivalent of an exchangeable cation selected from the group consisting of hydrogen, alkali metal, and alkaline earth metal ions, and mixtures thereof; and B is one equivalent of an anion selected from the group consisting of fluoride, hydroxyl, and oxygen ions, and mixtures thereof;

said crystalline material being further characterized by a $d_{001}$ spacing ranging from 9.6 to 10.2 angstrom units determined at 50% relative humidity, and being predominantly ordered in two dimensions; and (2) an amorphous porous inorganic oxide containing nickel and tin, or their compounds, in an amount of from 2 to 50 combined weight percent metals with a nickel to tin combined weight ratio of from 0.25 to 20 and at hydrocracking conditions sufficiently severe to convert at least 50 weight percent of the feed to products boiling below 150° F.

References Cited
UNITED STATES PATENTS

| | | | |
|---|---|---|---|
| 3,535,228 | 10/1970 | Csicsery et al. | 208—59 |
| 3,252,757 | 5/1966 | Granquist | 23—111 |
| 3,252,889 | 5/1966 | Capell et al. | 208—120 |
| 2,708,180 | 5/1955 | Von Fuener et al. | 208—111 |
| 2,911,356 | 11/1959 | Hanson | 208—112 |
| 3,073,777 | 1/1963 | Oettinger et al. | 208—111 |

DELBERT E. GANTZ, Primary Examiner

G. E. SCHMITKONS, Assistant Examiner

U.S. Cl. X.R.

208—110; 252—459,466 J, 477; 260—676 R